(12) United States Patent
Warfen et al.

(10) Patent No.: US 10,794,367 B2
(45) Date of Patent: Oct. 6, 2020

(54) DEVICE FOR MEASURING MOMENTS OF A WIND TURBINE, METHOD FOR OPERATING A WIND TURBINE, AND WIND TURBINE

(71) Applicant: SENVION GMBH, Hamburg (DE)

(72) Inventors: Karsten Warfen, Weede/Soehren (DE); Eckart Hopp, Schuelldorf (DE)

(73) Assignee: SENVION GMBH, Hamburg (DE)

( * ) Notice: Subject to any disclaimer, the term of this patent is extended or adjusted under 35 U.S.C. 154(b) by 58 days.

(21) Appl. No.: 16/140,922

(22) Filed: Sep. 25, 2018

(65) Prior Publication Data
US 2019/0093636 A1 Mar. 28, 2019

(30) Foreign Application Priority Data
Sep. 25, 2017 (DE) .................. 10 2017 008 938

(51) Int. Cl.
*G01L 5/00* (2006.01)
*F03D 17/00* (2016.01)
(Continued)

(52) U.S. Cl.
CPC ............. *F03D 17/00* (2016.05); *F03D 15/00* (2016.05); *F16H 57/025* (2013.01);
(Continued)

(58) Field of Classification Search
CPC ............. G01M 5/0066; G01M 5/0016; G01M 5/0083; G01M 5/0041; F03D 15/00;
(Continued)

(56) References Cited

U.S. PATENT DOCUMENTS

| | | | |
|---|---|---|---|
| 2009/0169357 A1* | 7/2009 | Slack | ................. G01L 5/0019 415/26 |
| 2012/0025526 A1* | 2/2012 | Luo | .................... H02P 9/04 290/44 |
| 2012/0134810 A1* | 5/2012 | Bagepalli | ........... G01M 5/0016 416/1 |

FOREIGN PATENT DOCUMENTS

| | | |
|---|---|---|
| CN | 2505330 | 8/2002 |
| CN | 101476961 | 7/2009 |

(Continued)

OTHER PUBLICATIONS

Search Report for German Patent Application No. 102017008938.8, dated Jul. 27, 2018, 7 pages.
(Continued)

*Primary Examiner* — Brandi N Hopkins
(74) *Attorney, Agent, or Firm* — Sheridan Ross PC

(57) ABSTRACT

The invention relates to a device for measuring moments of a wind turbine, comprising a carrier pin that can be fixedly connected to a bedplate of a nacelle of the wind turbine, which is arranged on a tower and can be adjusted with respect to yaw, a torque support of a gearbox of the wind turbine being mountable on the carrier pin via an elastomer body, and to a method for operating a wind turbine and the corresponding wind turbine. The carrier pin is provided with one or more sensors that are designed and arranged to detect strains and/or shears of the carrier pin, a signal processing and/or evaluation unit being provided, which is connected to the sensor(s) and which can determine, during operation of the wind turbine, from measurement signals of the sensors, pitch moments and/or yaw moments that act upon the torque support.

15 Claims, 4 Drawing Sheets

(51) Int. Cl.
*F03D 15/00* (2016.01)
*F16H 57/025* (2012.01)
*G01M 5/00* (2006.01)

(52) U.S. Cl.
CPC ....... *G01M 5/0066* (2013.01); *F05B 2260/80* (2013.01); *F05B 2260/964* (2013.01); *F05B 2270/1095* (2013.01); *F05B 2270/331* (2013.01); *F05B 2270/332* (2013.01); *F05B 2270/334* (2013.01); *F05B 2270/808* (2013.01)

(58) Field of Classification Search
CPC .......... F03D 80/70; F03D 17/00; F03D 15/10; F03D 9/25; F05B 2270/332; F05B 2270/331; F05B 2260/80; F05B 2270/808; F05B 2270/334; F05B 2260/4031; F16H 57/025; H02P 9/04; Y02E 10/72; F16C 35/047; F16C 41/00; F16C 2360/31; F16C 19/546; G01S 17/88
See application file for complete search history.

(56) References Cited

FOREIGN PATENT DOCUMENTS

| | | |
|---|---|---|
| CN | 102472251 | 5/2012 |
| CN | 105332856 | 2/2016 |
| DE | 102009039340 | 3/2011 |
| EP | 2846039 | 3/2015 |

OTHER PUBLICATIONS

Skorupa et al. "Riveted Lap Joins in Aircraft Fuselage Design, Analysis and Properties," Springer Netherlands, 2012, p. 105.

Extended Search Report for European Patent Application No. 18196204.4, dated Feb. 20, 2019, 6 pages.

Official Action for China Patent Application No. 201811112736.2, dated Apr. 20, 2020, 10 pages.

\* cited by examiner

DEVICE FOR MEASURING MOMENTS OF A WIND TURBINE, METHOD FOR OPERATING A WIND TURBINE, AND WIND TURBINE

CROSS-REFERENCE TO RELATED APPLICATIONS

This application claims the benefit of and priority to German Application No. DE 10 2017 008 938.8 having a filing date of Sep. 25, 2017, the entire disclosure of which is incorporated herein by reference.

FIELD OF THE INVENTION

The invention relates to a device for measuring moments of a wind turbine, comprising a carrier pin that is or can be fixedly connected to a bedplate of a nacelle of the wind turbine, which is arranged on a tower and which can be adjusted in respect of yaw, a torque support of a gearbox of the wind turbine being mountable or mounted on the carrier pin via at least one elastomer body, and to a wind turbine, and to a method for operating a wind turbine.

The present invention relates to the field of measuring moments of a wind turbine, particularly measuring torsional moments, pitch moments and yaw moments. These moments occur continuously in the operation of the wind turbine, and in particular in the case of the loadcase relating to the blade pass on the tower. Since modern rotor blades are frequently designed, in respect of their stiffness, for the loadcase of the blade pass, this measuring of the moments in wind turbines is now widespread. These moment measurements also frequently serve, inter alia, as inputs for system control, for instance for the purpose of load reduction, for identifying horizontal and vertical shears or for supporting the yaw control.

BACKGROUND

Known hitherto, inter alia, is the measurement of forces by means of material strain in the blade roots. This measurement results in high costs. Moreover, the properties of the glass-fiber reinforced plastics are complex, such that the evaluation of the measurement results of the strain gauges at the blade roots is not inconsequential.

Also known is the measurement of strains on the low-speed shaft, by means of strain gauges. In the case of measurement of strains on the low-speed shaft, application of the strain gauges is resource-intensive, such that the installation requirements are increased.

Alternative methods also include the measurement of distances from the hub connection of the low-speed shaft, and the measurement of the elastomer movement at the gearbox torque supports. The distance measurement at the hub connection is critical, owing to axial slack and other effects, while, in the case of the measurement of the elastomer movements at the gearbox torque supports, there arises the problem that the latter have a complex transfer function, and the elastomer properties are diverse and are highly temperature-dependent.

SUMMARY OF THE INVENTION

By contrast, the present invention is based on the object of rendering moment measurements on or in a wind turbine inexpensive and reliable.

This object is achieved by a device for measuring moments of a wind turbine, comprising a carrier pin that is or can be fixedly connected to a bedplate of a nacelle of the wind turbine, which is arranged on a tower and which can be adjusted in respect of yaw, a torque support of a gearbox of the wind turbine being mountable or mounted on the carrier pin, which device is developed in that the carrier pin is provided with one or more sensors that are designed and arranged to detect strains and/or shears of the carrier pin, a signal processing and/or evaluation unit being provided, which is connected to the sensor or sensors and which is designed to determine, during operation of the wind turbine, from measurement signals of the sensors of deflections and/or shears of the carrier pin, pitch moments and/or yaw moments that act upon the torque support.

The invention is based on the basic concept that forces in one or both carrier pins of the torque supports of the gearbox are measured, specifically in the form of measurement of deflections and/or shears of the carrier pins. These carrier pins are also referred to as pins or gearbox pins. The measurement of the deflection and shear of the pins, or carrier pins, is preferably effected in the micrometer range. Force and deflection measuring sensors suitable for industrial application are available.

Within the scope of the present application, the measurement of moments includes the measurement of forces, caused by the moments, that are produced as a reaction of the system to the wind field acting upon the wind turbine. These moments and forces are measured indirectly, usually via strains of structural elements of the wind turbine resulting from deflection or shear, which in turn are caused by forces that are due substantially to the moments of the wind turbine. These include the pitch moment, the yaw moment and the torque. The torque is the basis for energy utilization, the pitch and yaw moments being unavoidable disturbance effects.

Measurement of the deflection and/or shear of the carrier pin or of the carrier pins of the torque supports combines a plurality of advantages. On the one hand, the carrier pins are solid metal parts, which are usually of a cylindrical or otherwise regular design, at least in portions, and which therefore have a well known transfer function. This means that, in amount and direction, the deflection and/or shear of the respective carrier pin is a direct response to the force exerted upon the carrier pin. Deduction of the force being exerted is therefore uncomplicated. Carrier pins made of steel also offer a high repeatability, and a negligibly low temperature dependence in respect of their deflection and/or shear, or their measurement.

Furthermore, in a preferred embodiment, the carrier pin is connected to the bedplate, and thus provides the counter-bearing for the gearbox. The carrier pin is usually decoupled in a vibration-damping manner, by means of elastomer bodies, from the torque support or the bedplate.

The forces acting upon the gearbox, which are due, in particular, to the instantaneous yaw and pitch moments on the wind turbine, can thus be measured after having been decoupled, at least partially, from the high-frequency vibrations of the gearbox itself. Although the elastomer bodies of the elastomer bearing do have a damping effect, in each case the force that is transmitted from the gearbox to the bedplate is nevertheless exerted upon the carrier pin or carrier pins. Therefore, in the measurement of the deflection of the carrier pins, a non-falsified and direct measurement of the moments acting from the outside is obtained. The pitch moments and yaw moments of the wind turbine can thus be deduced from the forces acting upon the carrier pins or carrier pin.

In comparison with a sensor system at the rotor-blade roots, the costs are low. In comparison with the previously mentioned alternatives, installation is also simple, such that the commissioning and repair of the wind turbine are accelerated and rendered less expensive. With regard to the calibration and monitoring of this measurement, the device according to the invention offers the advantage that the torque of the wind turbine can be used for calibration and ongoing plausibility checking of the transfer function during operation. In this context, the transfer function means, for example, the transfer of the measured deformation (expressed, for example, in micrometers) over a force (e.g. expressed in kN) to a moment (for example, expressed in kNm).

If the measurement is effected in both carrier pins, i.e. to the left and right of the gearbox as viewed in the drive-train direction, the measurement for common-mode signals of pitch moments and yaw moments is partially technically redundant, such that plausibility checking and verification can likewise be effected. It is thus also possible, for instance, to identify defective sensors.

The measurement of the combination of deflection and shear of the carrier pin or carrier pins of the torque support has the particular advantage that a particularly simple measuring arrangement is thus rendered possible, since the sensors can be mounted substantially in a plane of the pin, and loads can nevertheless be sensed in two mutually orthogonal planes, e.g. yaw moment and pitch moment. The measuring arrangement is thereby simplified considerably.

In a preferred alternative, strain gauges are attached, as sensors, to the carrier pin. Strain gauges are robust and known sensors, which are well suited to the desired accuracy of strains, in the range of micrometers. They are electrical resistors, the electrical resistance of which varies with the linear expansion, such that the resistance is a measure of the linear deformation of the strain gauge itself. Measurements by means of strain gauges are thus very suitable for electrical or electronic measurements. According to the invention, the strain gauges are attached at points at which, during operation, the carrier pin or carrier pins undergo the greatest strains, allowing pitch moments or yaw moments to be deduced. The strain gauges can be protected by encapsulation within a sensor, such that they can attain the service life of the wind turbine.

In an advantageous development, for the purpose of measuring deflections of the carrier pin one or more strain gauges are aligned in the longitudinal direction of the carrier pin, and/or for the purpose of measuring shears of the carrier pin one or more strain gauges are aligned at an angle of 30° to 90°, in particular between 40° and 50°, in particular 45°, in relation to the longitudinal direction of the carrier pin. Strain gauges aligned in the longitudinal direction of the carrier pin allow deductions of a strain, or deflection, of the carrier pin, and are integrative for forces acting on the pin in the plane defined by the sensor and the pin longitudinal axis, while strain gauges aligned at an angle of 30° to 90°, in particular 45°, in relation to the longitudinal direction of the carrier pin react to shears of the carrier pin, and are particularly sensitive for forces acting upon the pin perpendicularly in relation to the plane defined by the sensor and the pin longitudinal axis.

If exclusively elongate strain gauges are used, they must be arranged on at least three different sides, as viewed in the circumferential direction of the carrier pin, to enable a distinction to be made between pitch moments and yaw moments. For reasons of redundancy, four different sides are to be preferred. In the case of a mixed use of longitudinal extent and transversely arranged strain gauges, the strain gauges may be arranged on one side or, for reasons of redundancy, on two sides in the circumferential direction of the carrier pin.

Horizontal and vertical loads of the carrier pins can also be measured in that strain gauges aligned in the longitudinal direction of the carrier pin are arranged, on the one hand, on the horizontally opposite sides, and on the other hand on the top and underside of the carrier pin. However, this does not enable shears of the carrier pin to be measured. Moreover, this requires a greater resource input, since twice the number of locations on the carrier pin must be prepared with sensors than in the case of use of longitudinally and obliquely placed strain gauges, which can be arranged in pairs in the installation position of the fully assembled wind turbine, horizontally on the left and right on the carrier pin.

If the carrier pin is passed through a bearing opening of the torque support and, with respectively one of two end portions, projects out of the bearing opening on both sides, strain gauges being arranged symmetrically in relation to a central plane of the bearing opening on the two projecting end portions, strain gauges being arranged, in particular, on each of the two end portions, on mutually opposite sides of the respective end portion, then a particularly precise and redundant measurement of the forces acting on the carrier pin is possible.

Thus, in this case it is then also possible to connect for measurement the respectively four strain gauges of the same type to form a bridge circuit, in the manner of a Wheatstone bridge, and in this way to realize, from the four individual measurements, a common, very sensitive measurement for the deflection or shear, or the force exerted upon the carrier pin. For this purpose, it is preferably provided that respectively four strain gauges aligned in the longitudinal extent of the carrier pin, and/or respectively four strain gauges aligned at an angle of 30° to 90° in relation to the longitudinal direction of the carrier pin, are interconnected to form a bridge circuit.

In a preferred development, it is provided that the strain gauges are countersunk into one or move prefabricated groove-type recesses, the recess or recesses being in particular coverable or covered with removable, preferably metallic, covers that shield against electromagnetic pollution. By the countersinking of the strain gauges in recesses, and in particular the further covering of these recesses with corresponding metallic or metalized covers, the electronic components and cables are protected against electromagnetic pollution (EMC), such that the measurement is not impaired by the electromagnetically polluted environment in the nacelle of the wind turbine. An electromagnetic shielding of this type is advantageous for the required accuracies of measurement. It is further advantageously provided for this purpose to have cable routings of the sensors on the carrier pin run in the recesses and/or in leadthroughs through the carrier pin.

In an alternative to purely metallic covers, the cover may also be realized in plastic that is provided with an EMC shielding, e.g. by embedding a metal mesh or by vapor deposition of a thin metal layer. A region that is subjected to a high degree of mechanical stress is that at which the carrier pins pass through the torque support of the gearbox. For this purpose, they can be decoupled from the torque support or from the bedplate by means of an elastomer body, for example a cylindrical rubber bushing. If a cylindrical rubber bushing is used at the site of passage through the torque support, the carrier pin is mechanically pressed, under high pressure, into a bearing opening of the torque support. In the converse configuration, in which the carrier pin is decoupled by means of elastomer rings with respect to the bedplate, the carrier pin is fitted directly in an eye of the torque support. In order to protect the cabling in this region of passage through the eye of the torque support, and to enable subsequent cabling or repair of the cabling, it is preferably provided to insert a tube, as a cable leadthrough, in the recess, in a central part of the carrier pin that is not accessible when in an integrated state in the torque support of the gearbox. This tube prevents the elastomer body from entering the channel, and thus keeps the latter free for drawing and laying cables.

Amplifier electronics, and if necessary evaluation electronics, may also advantageously be arranged in a depression or in a plurality of depressions of the carrier pin, and accordingly, if necessary, shielded electromagnetically by means of a cover.

In a likewise advantageous alternative or additional embodiment of the invention, the carrier pin, on at least one side, has a sensor bore in the longitudinal direction of the carrier pin, arranged within which bore is a sensor rod, the external diameter of which is smaller than an internal diameter of the sensor bore, the sensor rod being fixed, in particular detachably, in an end portion of the sensor bore, a sensor being arranged at the outlet of the sensor bore, which sensor is designed to determine deflections and/or deflection forces of the end of the sensor rod opposite to the fixed end of the sensor rod due to deflections or shears of the carrier pin. In this case, a sensor is let into the respective carrier pin, axially centered in a bore, the electronics preferably being seated in front of the carrier pin, and the deflection path of the carrier pin is transmitted to the sensor by means of the sensor rod. The latter is fixed in the bore at the end at which the bore terminates, and consequently undergoes every movement and deflection of the carrier pin at this point of fixing, and in the further course of the bore, as far as the outlet of the bore, does not further contact the side walls of the bore, since its external diameter is smaller than the internal diameter of the bore. The deflection path of the carrier pin is thus transmitted to the sensor. The bore for this deflection path sampling does not go through the entire carrier pin. The measurement may be effected mechanically, by contacting the free end of the sensor rod and by measuring its deflection or deflection force, or contactlessly, by optical, magnetic or other means.

As an alternative to this, in a likewise advantageous embodiment, the carrier pin, on at least one side, has a sensor bore in the longitudinal direction of the carrier pin, arranged within which bore is a sensor rod, the external diameter of which is smaller than an internal diameter of the sensor bore, the sensor rod being detachably fixed in an end portion of the sensor bore and at the outlet of the sensor bore, the sensor rod being provided with at least one sensor, in particular one or more strain gauges for measuring deflections and/or shears. In this case, the sensor rod directly executes the deflections and shears of the carrier pin concomitantly, since it is fixedly connected to the carrier pin at both of its ends. Since the sensor rod is itself equipped with sensors, in particular strain gauges, which measure deflections and shears of the sensor rod, the deflection and shear of the carrier pin is thus also measured.

Common to both embodiments having a sensor rod is that the sensor rod is easily accessible and can be replaced without demounting the torque bearing. In the second embodiment, in which the sensor rod is itself equipped with sensors, the sensors can be replaced together with the sensor rod. Since demounting of the gearbox, or of the torque support, is not necessary, the down-times for this operation are short. The replacement can be effected during the servicing works that are scheduled in any case.

The object on which the invention is based is also achieved by a wind turbine having a previously described device according to the invention for measuring moments of the wind turbine, the wind turbine having a nacelle, arranged on a tower and adjustable in respect of yaw, having a rotor having a substantially horizontal rotor axis, and having a drive train, which is driven or drivable by the rotor and which has a gearbox that is supported, via one or more torque supports, on a bedplate of the nacelle. As a result of accommodating the device according to the invention, this wind turbine has the same advantages, features and properties as the device according to the invention.

Advantageously, the gearbox is supported on the bedplate, on two opposite sides, by means of respectively one torque support, each of the two torque supports being provided with a corresponding, previously described device according to the invention, the two devices having a common signal processing and/or evaluation unit.

The object on which the invention is based is further achieved by a method for operating a wind turbine having a previously described device according to the invention, comprising a carrier pin that is or can be fixedly connected to a bedplate of a nacelle of the wind turbine, which is arranged on a tower and which can be adjusted in respect of yaw, a torque support of a gearbox of the wind turbine being mountable or mounted on the carrier pin via at least one elastomer body, the method being developed in that strains and/or shears of the carrier pin are measured by means of the one or more sensors on or in the carrier pin and, by means of the signal processing and/or evaluation unit that is connected to the sensor or sensors, pitch moments and/or yaw moments that act upon the torque supports are determined, during operation of the wind turbine, from measurement signals of the sensors of deflections and/or shears of the carrier pin.

The method also thus has the same advantages, properties and features as the device according to the invention and the wind turbine according to the invention.

Preferably, the pitch moments and yaw moments, in particular additionally also torques, determined from the measurement signals of the sensors are fed into a control device for pitch control, in particular for a torque control of the wind turbine or single-blade pitch control. The control system of the wind turbine can thus react rapidly to changing loads of the wind turbine, and initiate measures that reduce these loads.

Further features of the invention are disclosed by the description of embodiments according to the invention, together with the claims and the appended drawings. Embodiments according to the invention may fulfill individual features or a combination of a plurality of features.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The invention is described in the following, without limitation of the general concept of the invention, on the basis of exemplary embodiments, with reference to the drawings, express reference being made to the drawings in respect of all details according to the invention that are not explained in greater detail in the text. There are shown.

DETAILED DESCRIPTION

Figure 1:
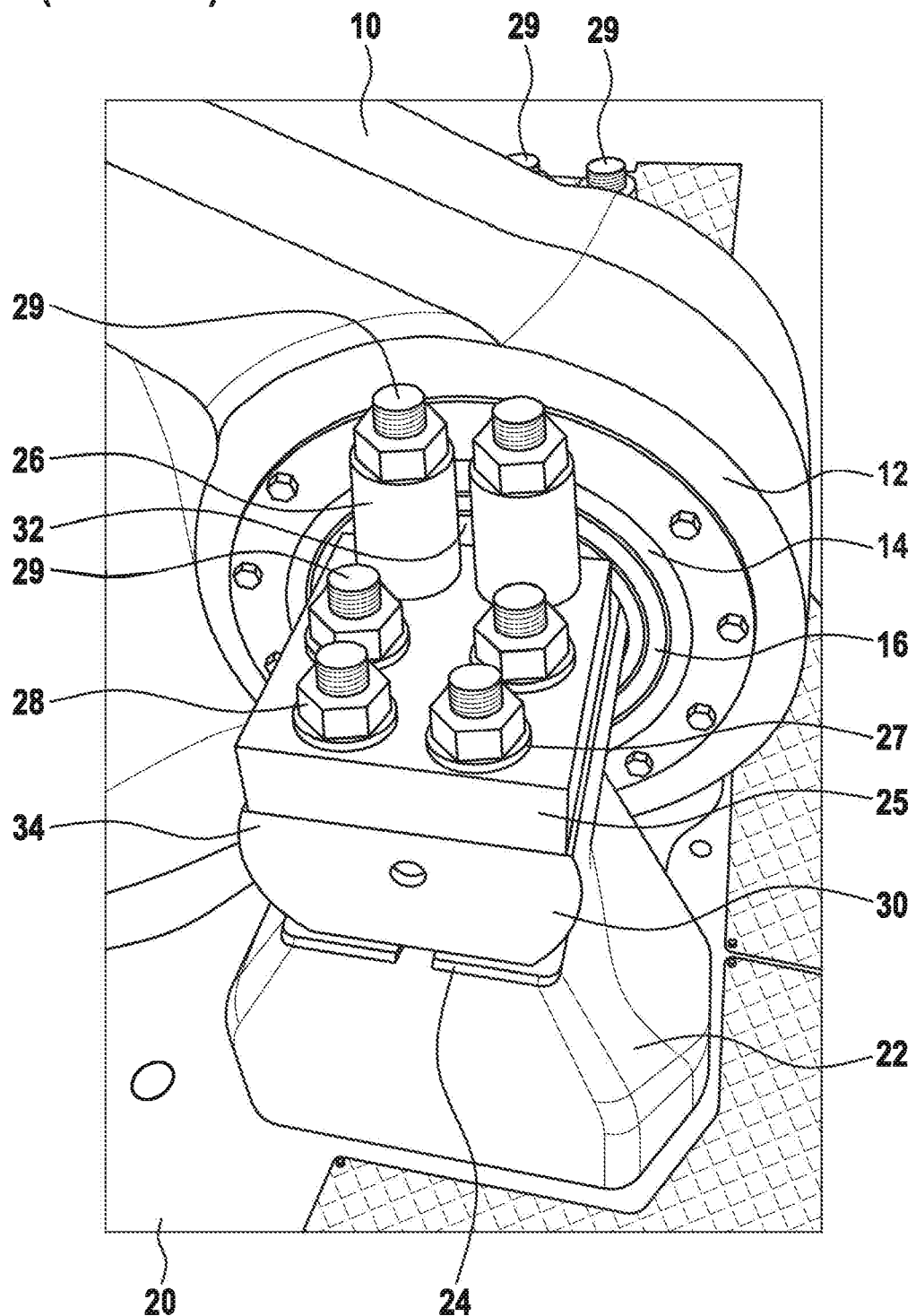
FIG. 1 a perspective representation of a known version of a bearing assembly of a torque support of a gearbox in the nacelle of a wind turbine, FIG. 2 an alternative embodiment, known from the prior art, of a torque support of a gearbox of a wind turbine.

In the drawings, elements and/or parts that are the same or similar are in each case denoted by the same references, such that in each case they are not presented over again.

FIG. 1 shows a perspective representation of a known version of a bearing assembly of a torque support 10 of a gearbox in the nacelle of a wind turbine having a substantially horizontal rotor axis. The torque support 10, the mirror-symmetrical counterpart of which, on the opposite side of the gearbox, not shown, is likewise not shown, has a bearing ring 12 having a bearing opening 14. This torque support is realized so as to constitute a single piece with the housing of the gearbox. Located in the bearing opening 14, concentrically from the outside inward, are a hollow-cylinder elastomer body 16 and, within the latter, a carrier pin 30. In the embodiment represented, the hollow-cylinder elastomer body 16 is composed of a concentric sequence of elastomer rings and cylindrical steel tube portions, which, being somewhat brighter, contrast with the darker elastomer.

The carrier pin 30 is realized basically as a solid steel cylinder, the end portions of which that project out of the bearing opening 14, of which one end portion 34 is represented in FIG. 1, while the opposite end portion 36 is concealed by the bearing ring 12, are each machined and flattened on a top side and an underside. The original cylindrical shape is still identifiable at the sides of the carrier pin 30. Likewise identifiable is the full-cylinder shape also on the central part 32 of the carrier pin 30, which is located inside the elastomer body 16 in the bearing ring 12, and a small portion of which can be seen in FIG. 1. The carrier pin 30 is fitted with a large amount of force, together with the elastomer body 16, into the bearing opening 14 of the bearing ring 12. Such a carrier pin 30 typically has a length of approximately 100 cm, the projecting portions 34, 36 each projecting by approximately 30 cm. The complete diameter of the corresponding cylinder is, for example, approximately 25 to 30 cm.

The fastening of the carrier pin 30 to the bedplate 20 that carries all components of the drive train of the wind turbine is effected by means of a spacer piece 22, the surface of which is fitted with bolsters 24, onto which the flattened underside of the projecting portion 34 of the carrier pin 30 is placed. A fastening block 25 is placed onto the flattened top side of the projecting portion 34. These parts have leadthrough bores, or leadthrough openings, not represented, for fastening bolts 29, which are fixed on the represented top side by means of washers 27, nuts 28 and possibly also inserted expansion sleeves 26, and are fixed to the bedplate 20 on the underside.

Figure 2:
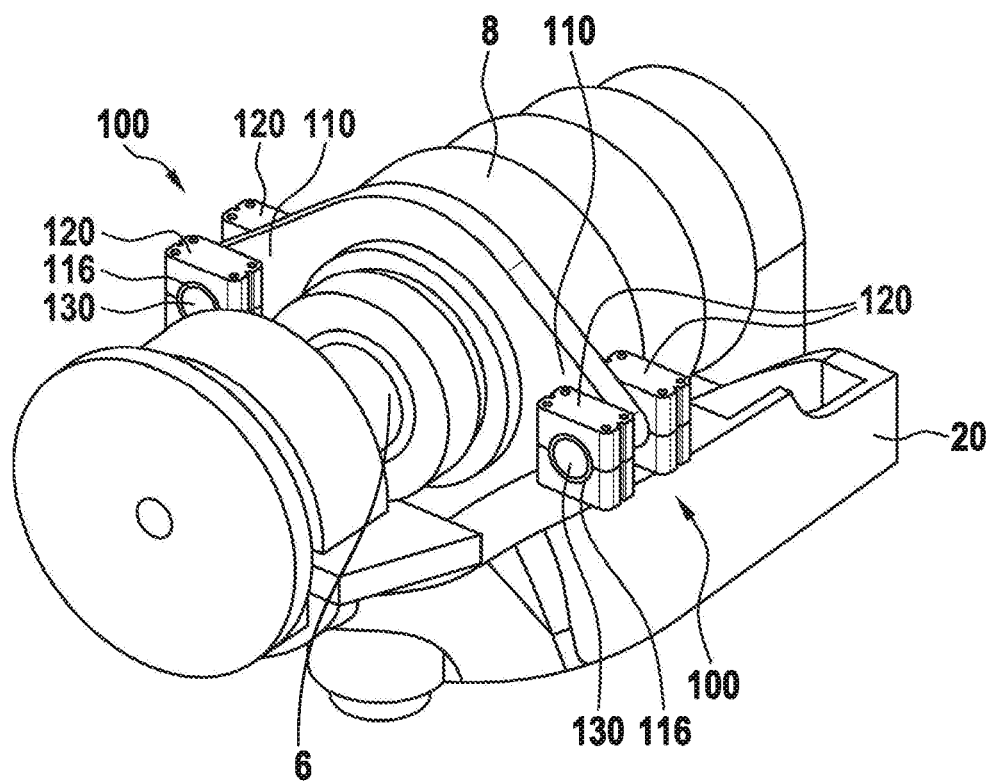

Represented in FIG. 2 is an alternative, known form of a torque support 110 of a torque bearing 100 of a gearbox 8 of a wind turbine driven by a rotor shaft 6, which form differs from the embodiment represented in FIG. 1 in that, in this case, the carrier pin 130 is pressed directly into an eye (not visible) of the torque support 110, without an elastomer ring, while clamping frames 120 (whereas in FIG. 1, the carrier pin 130 is shown with no clamping frames 120), which are fixedly connected to the bedplate 20, are arranged in front of and behind the torque support 110 in the axial direction of the carrier pin 130. The carrier pin 130 is clamped, by means of hollow-cylinder elastomer bodies 116, into the clamping frames 120, which can be split upwardly. In this embodiment, an elastomer-based decoupling is effected with respect to the bedplate 20. With appropriate dimensioning of the elastomer rings, it is also possible to use elastomer rings both in the clamping frames 120 and in the eye of the torque support 110.

In the exemplary embodiment of a torque bearing assembly shown in FIG. 2, the use of a sensor rod 62 according to FIG. 5 or FIG. 6, described below, is particularly appropriate, since the front faces of the carrier pins 130 are accessible.

To determine pitch moment and torque, the two carrier pins 130 represented on the left and right of the gearbox 8 must preferably be equipped with sensors. Otherwise, the torque can be determined only computationally, using the power and rotational speed, or comparable quantities.

Figure 3:
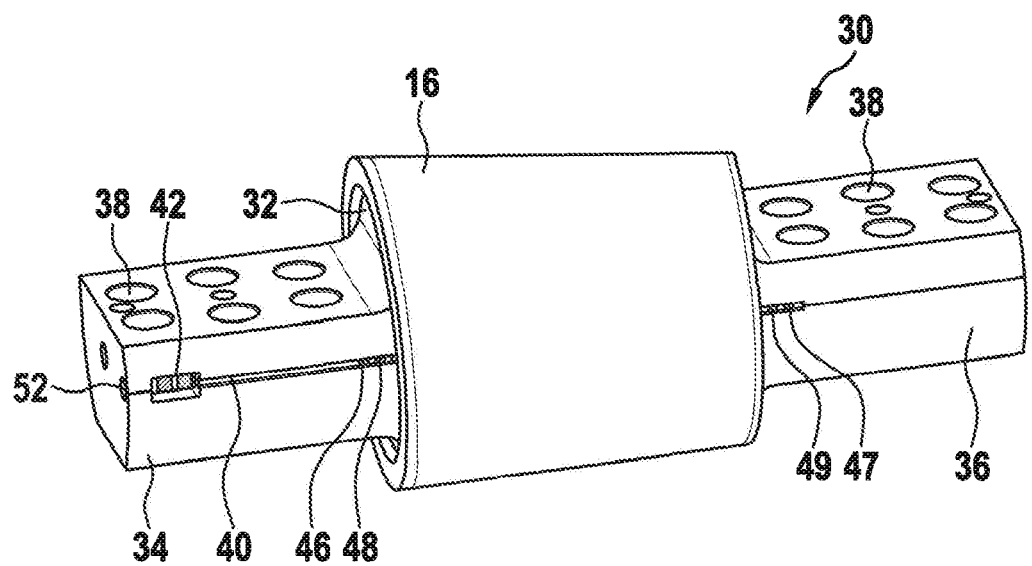
FIG. 3 a schematic, perspective representation of a part of a device according to the invention, in a first embodiment, FIG. 4 a detailed representation from the embodiment according to FIG. 3, FIG. 5 a schematic representation of a part of a device according to the invention, in a first version of a second embodiment, FIG. 6 a schematic representation of a part of a device according to the invention, in a second version of the second embodiment, FIG. 7 a schematic representation of a part of a device according to the invention, in a third version of the second embodiment.

Such a carrier pin, which in FIG. 1 is not yet fitted with sensors, is fitted according to the invention with sensors designed to measure deflections and/or shears of the carrier pin 30 caused by loads acting on the carrier pin 30. FIG. 3 is a schematic, perspective representation of a part of a device according to the invention in a first embodiment, in which the carrier pin 30 is provided with corresponding sensors in the form of strain gauges 46 to 49. The cylindrical central part 32 of the carrier pin 30 is fitted into the elastomer body 16. The torque support 10 has been omitted for reasons of clarity. Visible in both projecting portions 34, 36 are the bores 38 for the fastening bolts 29 shown in FIG. 1, and the preparation of the lateral faces of the projecting portions 34, 36 of the carrier pin 30 for receiving strain gauges 46 to 49, and the arrangement of these strain gauges 46 to 49. This preparation consists of groove-type recesses 40, which are symmetrically present on the represented lateral face and on the opposite, perspectively concealed, lateral face.

Preferably, the groove-type recesses for the main loads of the pin, consisting of pitch moment and torque, are located close to the neutral plane, in order not to weaken the pin unnecessarily. For the yaw moment, they are thus located in the main load direction, but this is less than the combination of the pitch moment and torque, and is therefore not a dimensioning factor for the pin.

The depth of these groove-type recesses 40 is preferably to be selected between a plurality of millimeters and approximately 3 cm, the strain gauges 46 to 49 preferably being able to be countersunk completely in the recesses 40. The groove-type recesses 40 extend through the middle portion.

Also visible in FIG. 3 is a recess 42 for an amplifier unit 50 that is represented in the form of two dark component parts within the recess 42. This recess 42 also, like the groove-type recess 40, can preferably be closed by means of a metallic cover, and thus secured against electromagnetic pollution. On the end face of the projecting portion 34 there is a depression 52 for a plug connector or cable for connection to the amplifier unit 50, which is connected to the recess 42. One or more further bores may go through the carrier pin 30, transversely in relation to its longitudinal direction, and connect the represented groove-type recess 40 to a corresponding groove-type recess on the other side (not represented), in order to render possible a uniform cabling that is fully protected against electromagnetic pollution.

Figure 4:
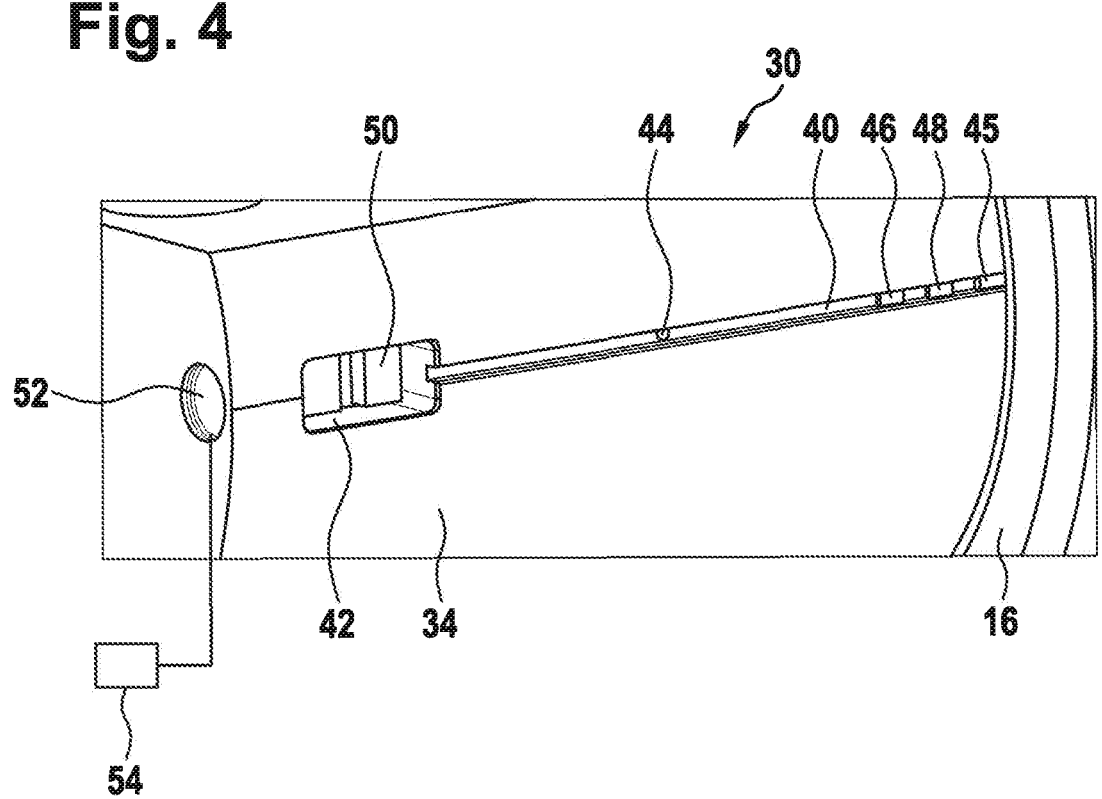

Shown in FIG. 4 is a detail representation from the embodiment according to FIG. 3, which shows more detail than FIG. 3. It is shown schematically that an electrical or electronic connection to an evaluation unit 54 is realized via the countersinking 52 into the end face of the projecting portion 34. A bore 44, for a cable routing to the opposite side of the carrier pin 30, is represented in the groove-type recess 40. Strain gauges 46, 48 are shown close to the central part 32 of the carrier pin 30, which is in the hollow-cylinder elastomer body 16, the strain gauge 48 being arranged closer than the strain gauge 46 to the central plane of the carrier pin 30. Both strain gauges 46, 48 are located outside the elastomer body 16, but close to the part of the carrier pin 30 that is subjected to the greatest load and that undergoes the greatest deflection.

The strain gauge 46 is aligned in the longitudinal direction of the carrier pin 30 and parallel to the alignment of the groove-type recess 40, and thus measures changes in length at this point on the basis of deflections of the strain gauge. The strain gauge 48 has a 45° transverse orientation in relation to the longitudinal extent of the carrier pin 30, and identifies shears of the carrier pin 30. The strain gauges 47 and 49 represented in FIG. 3 are again a longitudinally aligned strain gauge 47, at a position in relation to the central plane that is mirror-symmetrical in relation to the strain gauge 46, while the strain gauge 49 is again a strain gauge inclined by 45°, which is arranged with mirror symmetry in relation to the strain gauge 48, and the orientation of which is likewise mirror-symmetrical in relation to the orientation of the strain gauge 48. The orientation of the strain gauge 49 is thus rotated by 90° relative to the orientation of the strain gauge 48. On the opposite, non-represented, side of the carrier pin 30 there is a similar constellation of longitudinally and transversely oriented strain gauges, such that the respectively four similar strain gauges can be interconnected to form a bridge circuit in the manner of a Wheatstone bridge.

In the installation position shown, the strain gauges 46, 47 oriented in the longitudinal direction are thus suitable for detecting a force acting horizontally on the pin, i.e. a force that acts within the plane through the sensor and the pin longitudinal axis. In the installation position shown in FIGS. 1 and 3, this is the yaw moment of a wind turbine.

In the installation position shown, the strain gauges 48, 49 oriented obliquely at 45° are suitable for detecting the force acting perpendicularly on the pin, i.e. a force that acts perpendicularly in relation to the plane through the sensor and the pin longitudinal axis. In the installation position shown in FIGS. 1 and 3, this is the pitch moment and the torque of a wind turbine. In order to distinguish whether a moment is a yaw moment or a pitch moment, the respective carrier pin must be equipped with measuring sensors on both sides of the gearbox.

Also visible in FIG. 4 is a high-grade steel tube 45, which is let into the groove-type recess 40 at the location of the elastomer body 16 and which prevents pinching of cables in this portion. The high-grade steel tube 45 therefore allows subsequent cabling of the sensors or repair of the cabling.

Figure 5:
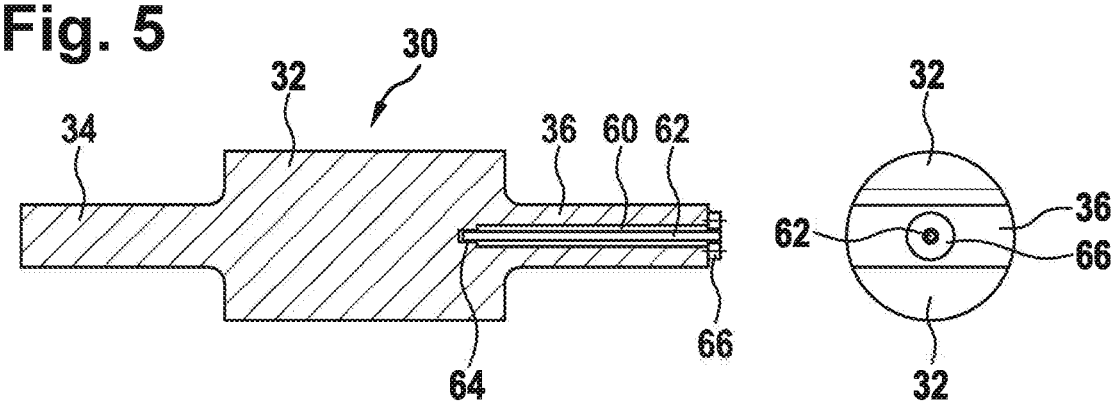

FIG. 5 shows a schematic representation of a part of a device according to the invention, in a first version of a second embodiment. A carrier pin 30, embodied as in FIG. 1 is represented in cross section on the left side. Shown on the right side is a top view of the carrier pin 30, from the side of the projecting portion 36.

Shown instead of strain gauges is a sensor arrangement that has a sensor bore 60, through the longitudinal axis of the cylindrical carrier pin 30, which extends into the central part 32 of the carrier pin 30. The inner end of the sensor bore 60 has a fixing 64 for a sensor rod 62, which is fixed in the fixing 64 such that, in the event of deformations of the carrier pin 30, the sensor rod 62 assumes the orientation of the carrier pin 30 at the location of the fixing 64. Since the sensor rod 62 is narrower than the bore 60, the sensor rod 62 can move freely in the further course of the bore, and therefore at its free end undergoes a deflection, relative to the non-loaded, idle state of the carrier pin 30, that is manifested in an approach toward the inner wall of the sensor bore 60 in the region of the outlet of the sensor bore 60. The magnitude and direction of the deflection indicate the magnitude and direction of the exertion of force of the torque support 10 upon the carrier pin 30.

Arranged at the end of the sensor bore 60 is a sensor 66 that senses this deflection, either geometrically or in the form of a deflection force exerted by the sensor rod upon the sensor 66. The sensor 66 may be realized either as a force sensor that contacts the sensor rod and picks up its deflection force and direction of deflection, or as a position sensor, which, by contact or contactlessly, determines the distance and direction of the deflection.

Figure 6:
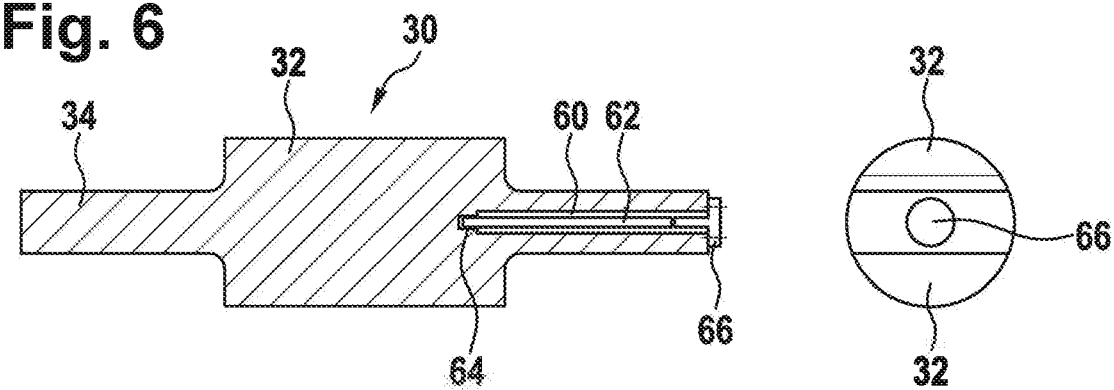

For this purpose FIG. 6, in an alternative form, shows a schematic representation of a part of a device according to the invention, in a second version of the second embodiment. This version differs from the variant represented in FIG. 5 in the type of sensor, which is inserted, as a full plug-in, into the sensor bore 60 and contacts the sensor rod 62 within the sensor bore 60. It is thus possible, for example, for the sensor 60 itself to be screwed into the sensor bore 60 by means of an internal thread on the inner wall of the sensor bore 60 and an external thread on the outer envelope of the sensor 66, and to be fixedly attached there in such a manner.

FIG. 5 shows a schematic representation of a part of a device according to the invention, in a third version of the second embodiment. The type of the sensor 66 again corresponds to that from FIG. 5. Unlike the variants from FIG. 5 and FIG. 6, however, the measuring bore 60 is not arranged in the projecting part 36, but in the central part 32 of the carrier pin 30. This has the advantage that the entire length of the sensor rod 62 is arranged in the part of the carrier pin 30 that bends the most, and thus undergoes a particularly pronounced deflection, which improves the measuring accuracy. This is achieved at the cost of a reduced accessibility of the measuring arrangement, as compared with the variant represented in FIG. 5 and FIG. 6.

Figure 7:
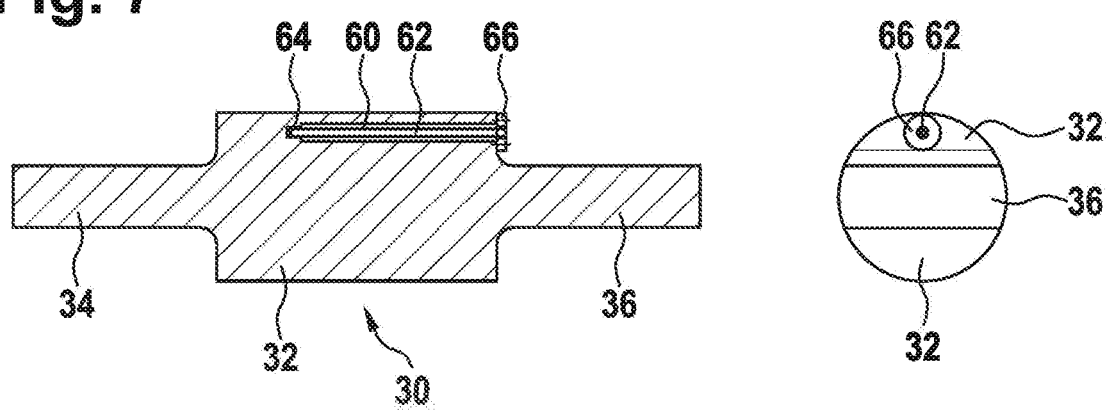

The measuring arrangement represented in FIG. 7 may also be equipped with a sensor 66 according to FIG. 6. In all exemplary embodiments of FIGS. 5, 6 and 7, instead of only one measuring arrangement having a measuring bore 60 and a sensor 66, it is also possible to provide, for example, a symmetrical arrangement having two measuring arrangements, which extend into the central part 32 from both sides of the torque support 10.

The sensor rods 62 shown in FIGS. 5 to 7 may themselves also be equipped with strain gauges that are arranged in the longitudinal direction and obliquely thereto, in order to measure deflections and shears of the sensor rod 62, which for this purpose is detachably fixed at both of its ends in the carrier pin 30, and to determine therefrom the various moments acting upon the wind turbine. Such a sensor rod 62, equipped with its own sensors, can also be replaced easily and rapidly, for example during servicing works, without the need to detach the torque support 10.

All stated features, including the features given solely by the drawings and individual features that are disclosed in combination with other features, are considered to be essential for the invention, singly and in combination. Embodiments according to the invention may be fulfilled by individual features or a combination of a plurality of features. Features that are characterized by "in particular" or "preferably" are to be understood as optional features within the scope of the invention.

LIST OF REFERENCES 6 rotor shaft
8 gearbox
10 torque support
12 bearing ring
14 bearing opening
16 hollow-cylinder elastomer body
20 bedplate
22 distance piece
24 bolster
25 fastening block
26 expansion sleeve
27 washer
28 nut
29 fastening bolt
30 carrier pin
32 central part of the carrier pin
34, 36 projecting portion of the carrier pin
38 bore for fastening bolt
40 groove-type recess
42 recess for amplifier unit
44 bore for cable routing
45 high-grade steel tube
46, 47 strain gauge, elongate
48, 49 strain gauge, transverse
50 amplifier unit
52 countersinking for plug connector for connection to amplifier unit
54 evaluation unit
60 sensor bore
62 sensor rod
64 fixing
66 sensor
100 torque bearing
110 torque support
116 hollow-cylinder elastomer body
120 clamping frame
130 carrier pin

What is claimed is:

1. A device for measuring moments of a wind turbine, comprising:
   a carrier pin that is configured to be connected to a bedplate of a nacelle of the wind turbine, which is arranged on a tower and which can be adjusted in respect of yaw, a torque support of a gearbox of the wind turbine being mountable or mounted on the carrier pin, wherein the carrier pin is provided with one or more sensors that are designed and arranged to detect strains and/or shears of the carrier pin, and
   a signal processing and/or evaluation unit connected to the one or more sensors, wherein the signal processing and/or evaluation unit is designed to determine pitch moments and/or yaw moments that act upon the torque support from measurement signals of the one or more sensors measuring deflections and/or shears of the carrier pin during operation of the wind turbine, and
   wherein the one or more sensors comprise one or more strain gauges attached to the carrier pin.

2. The device according to claim 1, wherein the one or more strain gauges are aligned in a the longitudinal direction of the carrier pin for measuring deflections of the carrier pin, and/or the one or more strain gauges are aligned at an angle of 30° to 90°, in relation to the longitudinal direction of the carrier pin for measuring shears of the carrier pin.

3. The device according to claim 2, wherein the one or more strain gauges include four strain gauges aligned in the longitudinal direction of the carrier pin and which are interconnected to form a bridge circuit, and/or the one or more strain gauges include four strain gauges aligned at an angle of 30° to 90° in relation to the longitudinal direction of the carrier pin and which are interconnected to form a second bridge circuit.

4. The device according to claim 1, wherein the carrier pin is passed through a bearing opening of the torque support and a first end portion and a second end portion of the carrier pin projects out of the bearing opening on opposing sides of the bearing opening, the one or more strain gauges being arranged symmetrically in relation to a central plane of the bearing opening on the two projecting end portions.

5. The device according to claim 1, wherein the one or more strain gauges are countersunk into one or more prefabricated groove-type recesses.

6. The device according to claim 5, wherein at least one cable routing of the one or more sensors on the carrier pin run in the one or more recesses and/or in one or more leadthroughs through the carrier pin.

7. The device according to claim 5, wherein a tube is inserted, as a cable leadthrough, in the one or more recesses, in a central part of the carrier pin that is not accessible when in an integrated state in the torque support of the gearbox.

8. The device according to claim 1, wherein the carrier pin, on at least one side, has a sensor bore in a longitudinal direction of the carrier pin, the device further comprising:
a sensor rod arranged within the sensor bore, an external diameter of which is smaller than an internal diameter of the sensor bore, the sensor rod being fixed in an end portion of the sensor bore, at least one of the one or more sensors arranged at an outlet of the sensor bore, wherein the at least one of the one or more sensors is designed to determine deflections and/or deflection forces of an end of the sensor rod opposite to the fixed end of the sensor rod due to deflections or shears of the carrier pin.

9. The device according to claim 1, wherein the carrier pin, on at least one side, has a sensor bore in a longitudinal direction of the carrier pin, the device further comprising:
a sensor rod arranged in the sensor bore, an external diameter of which is smaller than an internal diameter of the sensor bore, the sensor rod being detachably connected in an end portion of the sensor bore and at an outlet of the sensor bore, the sensor rod being provided with at least one of the one or more sensors.

10. A wind-turbine having at least one device according to claim 1 for measuring moments of the wind turbine, the wind turbine having a nacelle, arranged on a tower and adjustable in respect of yaw, having a rotor having a horizontal rotor axis, and having a drive train, which is driven or drivable by the rotor and which has a gearbox that is supported, via one or more torque supports, on a bedplate of the nacelle.

11. The wind turbine according to claim 10, wherein the at least one device includes two devices for measuring moments of the wind turbine, and wherein the gearbox is supported on the bedplate, on two opposite sides, by means of respectively a first torque support and a second torque support, the first torque support having one of the two devices and the second torque support having the other of the two devices, the two devices having a common signal processing and/or evaluation unit.

12. A method for operating a wind turbine having a device according to claim 1, comprising: a carrier pin that is configured to be connected to a bedplate of a nacelle of the wind turbine, which is arranged on a tower and which can be adjusted in respect of yaw, a torque support of a gearbox of the wind turbine being mountable or mounted on the carrier pin, wherein strains and shears of the carrier pin are measured by means of the one or more sensors on or in the carrier pin and, by means of the signal processing and/or evaluation unit that is connected to the one or more sensors, pitch moments and/or yaw moments that act upon the torque supports are determined, during operation of the wind turbine, from measurement signals of the one or more sensors of deflections and/or shears of the carrier pin.

13. The method according to claim 12, wherein the pitch moments and yaw moments determined from the measurement signals of the one or more sensors are fed into a control device for torque control of the wind turbine and/or for pitch control.

14. A device for measuring moments of a wind turbine, comprising:
a carrier pin that is configured to be connected to a bedplate of a nacelle of the wind turbine, which is arranged on a tower and which can be adjusted in respect of yaw, a torque support of a gearbox of the wind turbine being mountable or mounted on the carrier pin, wherein the carrier pin is provided with one or more sensors that are designed and arranged to detect strains and/or shears of the carrier pin, wherein the carrier pin, on at least one side, has a sensor bore in a longitudinal direction of the carrier pin;
a sensor rod arranged within the sensor bore, an external diameter of which is smaller than an internal diameter of the sensor bore, the sensor rod being releasably coupled, in an end portion of the sensor bore, the one or more sensors being arranged at an outlet of the sensor bore, which the one or more sensors is designed to determine deflections and/or deflection forces of an end of the sensor rod opposite to the releasably coupled end of the sensor rod due to deflections or shears of the carrier pin; and
a signal processing and/or evaluation unit being provided, which is connected to the one or more sensors and which is designed to determine, during operation of the wind turbine, from measurement signals of the one or more sensors, deflections and/or shears of the carrier pin, pitch moments and/or yaw moments that act upon the torque support.

15. A device for measuring moments of a wind turbine, comprising:
a carrier pin that is configured to be connected to a bedplate of a nacelle of the wind turbine, which is arranged on a tower and which can be adjusted in respect of yaw, a torque support of a gearbox of the wind turbine being mountable or mounted on the carrier pin, wherein the carrier pin is provided with one or more sensors that are designed and arranged to detect strains and/or shears of the carrier pin, wherein the carrier pin, on at least one side, has a sensor bore in a longitudinal direction of the carrier pin;
a sensor rod arranged in the sensor bore, an external diameter of which is smaller than an internal diameter of the sensor bore, the sensor rod being releasably coupled in an end portion of the sensor bore and at an outlet of the sensor bore, the sensor rod being provided with the one or more sensors; and
a signal processing and/or evaluation unit being provided, which is connected to the one or more sensors and which is designed to determine, during operation of the wind turbine, from measurement signals of the one or more sensors, deflections and/or shears of the carrier pin, pitch moments and/or yaw moments that act upon the torque support.

* * * * *